United States Patent

[11] 3,536,170

| [72] | Inventors | Harold W. Bell<br>Irvine;<br>Robert G. Cook, San Pedro, and Lester G. Hall, Los Angeles, California |
|---|---|---|
| [21] | Appl. No. | 767,409 |
| [22] | Filed | Oct. 14, 1968 |
| [45] | Patented | Oct. 27, 1970 |
| [73] | Assignee | North American Rockwell Corporation |

[54] SHOCK ABSORBER INCLUDING A GROOVED PISTON AND GUIDE MEANS THEREFOR
1 Claim, 2 Drawing Figs.

[52] U.S. Cl. .................................................. 188/311
[51] Int. Cl. ........................................................ F16f 9/02
[50] Field of Search............................................ 188/88BA,
88BB, 88.53, 88.506, 88.508, 94, 96.7, 97, 97.1;
16/66, 84; 188/88.59

[56] References Cited
UNITED STATES PATENTS

| 1,833,121 | 11/1931 | Norton | 188/97UX |
| 1,869,752 | 8/1932 | Jakosky et al. | 188/94UX |
| 3,236,339 | 2/1966 | Duckett | 188/100(S)UX |

Primary Examiner—George E. A. Halvosa
Attorneys—William R. Lane, L. Lee Humphries and Edward Dugas ABSTRACT: An improved shock absorber having a piston slidably mounted in a cylinder. The cylinder and piston define a cavity for the working fluid which is in fluid communication with the ambient fluid through a plurality of orifices in the cylinder wall. Tapered grooves on the piston cooperate with the orifices in the cylinder wall to control the expulsion rate of the working fluid from the cavity as the piston moves to reduce the cavity volume.

Patented Oct. 27, 1970

3,536,170

INVENTORS
HAROLD W. BELL
ROBERT G. COOK
BY LESTER G. HALL

*Edward Dugas*

ATTORNEY

SHOCK ABSORBER INCLUDING A GROOVED PISTON AND GUIDE MEANS THEREFOR

BACKGROUND OF THE INVENTION

1. Field of the Invention

This invention pertains to the field of shock absorbers and, more particularly, to shock absorbers that use as a working fluid the fluid of the medium around it. Also a metering fluid flow means is incorporated to retard the motion of the piston as the end of its stroke is approached.

2. Background of the Invention

Shock absorbers have been a part of the art of motion and force dampening for a long time. However, the majority of shock absorbing devices of the plunger type operate with a fixed volume of working fluid internal to the shock absorber body. Any action of the shock absorber merely reroutes the working fluid through various passages within the body of the device. Thus, means for excluding foreign fluids and matter is always required. A few devices have incorporated the use of air as a working fluid, when in an air medium. In addition, various devices have been disclosed that will progressively retard the stroke of the piston as it nears the end of its stroke.

As far back as 1911, C. S. Gurney, in U.S. Pat. No. 1,005,201 entitled PNEUMATIC CUSHION FOR VEHICLES utilized air as a working fluid in an air medium by increasing and decreasing the size of an air cushion by uncovering and covering air passages with plates attached to a slidable piston.

U.S. Pat. No. 1,067,130 entitled SHOCK ABSORBER by G. E. Newell disclosed an air medium shock absorber where a slidable piston forced air out or allowed air to enter the body of the shock absorber through tapered slots and thus give a cushioning effect.

Another device which is of interest, to show the state of the art, is disclosed in U.S. Pat. No. 1,821,787 entitled RETARDING DEVICE by C. H. Black. In that patent there is disclosed a slidable plunger that as it descends covers apertures for passage of the working fluid. Metering is digitally provided by the number of holes allowed for porting the fixed volume working fluid.

U.S. Pats. Nos. 2,896,227 and 2,507,266, both entitled SHOCK ABSORBER, by E. L. Beecher and W. G. Patriquin, respectively, disclose a plurality of grooved passageways arranged circumferentially around a piston that are deeper at their "downstroke" end than their upper end for the purpose of decreasing the resistance of the flow of fluid through the grooves during the impact or compression stroke of the piston. Both of these disclosures operate with a fixed volume of working fluid.

G. F. Kenworthy obtained U.S. Pat. No. 3,344,894 entitled ADJUSTABLE HYDRAULIC SHOCK ABSORBER for a device that uses a plurality of holes and tapered grooves spaced circumferentially around the piston cylinder. This disclosure does not, however, incorporate the metering means into the slidable piston.

All of the above patents fail to show the novel cooperation of components described herein, namely a device that utilizes the surrounding medium as a working fluid and has a metering means incorporated with the slidable piston.

SUMMARY OF THE INVENTION

In the preferred embodiment of the invention, a shock absorber is comprised, in part, of a piston which is slidably mounted within a cylinder. A plurality of holes are spaced circumferentially through the cylinder. Also a plurality of tapered grooves are spaced on the piston so that they cooperate with the holes of the cylinder. The holes of the cylinder are adapted to communicate with an ambient fluid and a cavity which is defined by the bottom of the cylinder, the wall of the cylinder, and the bottom of the piston. As the piston descends, the tapered grooves of the piston reduce the accessibility of the spaced holes through the cylinder to the ambient working fluid being forced from the cylinder. The flow of the fluid from the cylinder cavity is thereby retarded. When the load is released from the piston, a spring returns the piston to its normal position which increases the accessibility of the fluid to the spaced holes. Throughout the operation the ambient fluid supplies the working fluid. Venting means are provided with the invention to insure that no gaseous bubbles are entrapped within the cylinder or the piston.

Accordingly, it is an object of the present invention to provide an improved shock absorber.

Another object of the invention is to provide a shock absorber that utilizes the surrounding medium as a working fluid and is thus suitable for applications involving the total submergence of the shock absorber in fluids.

It is a further object of this invention to provide a shock absorber that does not require sealing from the surrounding medium, has few moving parts, and is virtually maintenance free because of its simple construction.

In addition, it is an object of this invention to provide a shock absorber of the above description that meters the flow of the working fluid as the end of stroke approaches to gradually reduce the motion of the piston.

The aforementioned and other objects of the present invention will become more apparent and better understood when taken in conjunction with the following description and drawings, throughout which like character indicate like parts, and which drawings form a part of this application.

BRIEF DESCRIPTION OF THE PREFERRED EMBODIMENT

Figure 1:
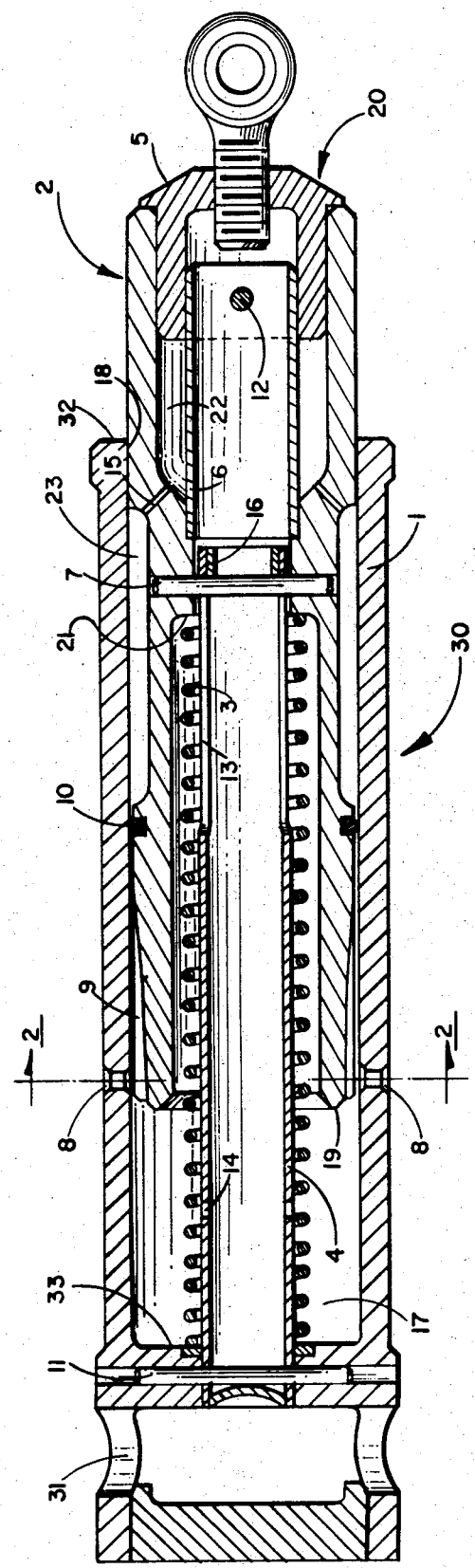
FIG. 1 is a sectional view taken along the center of the shock absorber of this invention.
Figure 2:
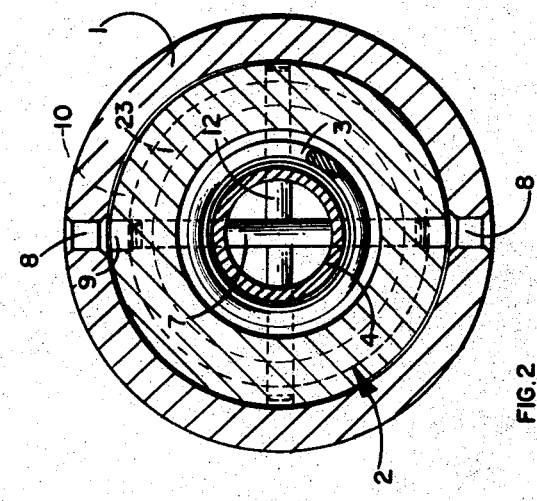
FIG. 2 is cross-sectional view taken along the section line 2–2 of FIG. 1.

Referring to FIGS. 1 and 2, the shock absorber 30 is comprised in part of the piston 2 which is concentrically mounted in the cylinder 1. The cylinder 1 contains a plurality of orifices 8 arranged circumferentially through the cylinder 1. The preferred embodiment shown in FIG. 1 has two such orifices 8, however, a single orifice or more than two may be used. One end of the cylinder 1 is provided with a through bore 31 which is adapted to receive a shaft which in turn is affixed to some object that is to be protected by the shock absorber 30. The other end 32 of the cylinder 1 is open to accommodate the piston 2. The end 19 of the piston 2 when inserted in the cylinder 1 defines a fluid cavity 17. The piston cooperates with the cylinder 1 through a sliding cylindrical surface 18 and a seal 10 which seals the fluid cavity and is located on the outer periphery of piston 2. The seal 10 is positioned past the end of tapered slots 9 when moving from end 19 to end 20 of the piston 2. The end 20 of the piston 2, away from the fluid cavity 17, is sealed by an end fitting 5. A return spring 3 pushes against end 33 of the cylinder 1. The other end of spring 3 pushes against the face 21 of piston 2. The spring 3 operates to extend the piston 2 to its normal position after compression of spring 3 against face 21. A spring guide tube 4 extends through the center of spring 3 and is attached at one end thereof to cylinder 1 by pin 11. Two closed elongated slots 13 are provided in the other end of the spring guide 4 along the longitudinal axis of the guide. An antirotation pin 7 extends through the elongated slots and is affixed at both ends in the walls of the piston 2. The elongated slots 13 are of sufficient length to allow full travel of the piston 2 to substantially the bottom of the cylinder 1. Contact by pin 7 with one end of slots 13 prevents extension of piston 2 beyond the desired fully extended position in the outer cylinder. A reinforcing ring 16 welded on the inner diameter of the spring guide tube 4 provides added support for the pin 7 when piston 2 is in its fully extended position. A close out tube 6 cooperates through a press fit with the piston 2 and the end fitting 5. Tube 6 internally seals the fluid cavity 17 and prevents any trapping of air in the piston 2. Orifices 14 extend through the walls of the spring guide 4 to prevent any entrapment of air in the piston 2. Orifice 15 extends through the wall of the piston to permit fluid communications with cavities 22 and 23. The orifices 14, 15 and guide slots 13 all serve as a venting means for the piston 2.

Extending from piston end 19 to a point on the piston short of seal 10 are tapered grooves 9. The tapered grooves 9 and the orifices 8 cooperate in a manner such that as piston 2 moves into cylinder 1 so as to decrease the volume of fluid cavity 17, the cross-sectional fluid flow area from the fluid cavity 17 to orifices 8 decreases. The decrease in cross-sectional fluid flow area results in less fluid flow to orifice 8 and thus the motion of piston 2 is retarded because of the fluid remaining in cavity 17. The spring guide 4, the antirotation pin 7 and the slots 13 cooperate to keep the orifices 8 and the tapered grooves 9 aligned during motion of the piston 2 within the cylinder 1.

Referring to FIG. 2, the tapered grooves 9 are shown in alignment with the orifices 8.

In operation, a force exerted along the longitudinal axis of the piston tends to produce motion of the piston inside the outer cylinder. As the piston 2 enters farther into the cylinder 1, working fluid is forced out of cavity 17 through orifices 8. Before the fluid can leave cavity 17 through orifices 8 as the piston 2 continues into cylinder 1, the fluid is required to travel through a continually decreasing area as a result of the taper of tapered grooves 9. In order for the same volume of fluid to be discharged through orifices 8 as the piston 2 descends, increasing velocity of the fluid through the cross-sectional area must be realized. Since the tapered grooves 9 restrict the accessibility of orifices 8 to the fluid, the fluid is not able to achieve the required velocity and the fluid cannot, therefore, leave orifices 8 in the same quantity as before. As a result the motion of piston 2 is retarded as it nears the bottom end of the cylinder 1. As piston 2 nears the end of its stroke, grooves 9 completely seal off orifices 8 and no more fluid is allowed to leave the cavity. This occurs prior to seal 10 moving past orifices 8, thus no seal deterioration occurs from the edges of the orifices 8 rubbing the seal 10.

While there has been shown what is considered to be the preferred embodiment of the present invention, it will be manifest that many changes and modifications may be made therein, without departing from the essential spirit of the invention. It is intended, therefore, in the annexed claims to cover all such changes and modifications as may fall within the true scope of the invention.

I claim:
1. A shock absorber for use in a fluid environment comprising:
   a cylinder closed at one end, and said one end having an axially aligned aperture;
   a guide tube axially disposed within said cylinder and closing said axially aligned aperture;
   means for attaching said guide tube to said one end;
   a piston slidably mounted within said cylinder, said piston having an axial well opening from one end thereof for receiving said guide tube;
   said cylinder having at least one radially disposed hole;
   said piston having at least one tapered groove that cooperates with said hole;
   means on said cylinder and said piston for preventing rotation therebetween, said means including said guide tube having oppositely disposed slots that extend axially, said piston having two radial apertures aligned with each other, and an antirotation pin extending through said two radial apertures and said slots; and
   a return spring disposed around said guide tube and between said one end on said cylinder and said antirotation pin for pushing said piston out of said cylinder until said antirotation pin bears against an end of said slots.